Patented Jan. 20, 1942

2,270,445

UNITED STATES PATENT OFFICE 2,270,445

RECOVERY OF VANADIUM, URANIUM, AND RADIUM FROM THEIR ORES

Leslie G. Jenness, Englewood, N. J., assignor, by mesne assignments, to Vanadium Corporation of America, New York, N. Y., a corporation of Delaware No Drawing. Application August 15, 1940, Serial No. 352,813

10 Claims. (Cl. 23—17)

This invention relates to the separation of metals and more particularly to the separation and recovery of vanadium, uranium and radium from ores containing these metals.

Prior processes of separating and recovering vanadium, uranium and radium from ores containing these metals have in general involved leaching the ore with an alkali metal carbonate solution followed by leaching with an acid solution. Various modifications of these leaching steps and variations in the sequence of the steps have been proposed but in general two or more of the metals as well as other metals contained in the ore are extracted by the leaching solutions employed resulting in difficultly separable mixtures. Large amounts of leaching agents have been necessary to extract the desired metals and extensive purification steps have been required in order to separate the metals from each other and from other metals present in the extract.

In accordance with the present invention vanadium, uranium and radium may be separately extracted from the ore in the form of substantially pure compounds of the desired metals.

An object of the present invention is, therefore, to provide an improved process of separately recovering vanadium, uranium and radium from ores containing the same.

Another object of the invention is to provide a process for recovering vanadium, uranium and radium from ores in which process these metals are separately extracted.

A further object of the invention is to provide an improved process of separately extracting uranium, vanadium and radium from an ore in which process a minimum of extraction reagents are required.

Other objects and advantages of the invention will appear in the following description of the preferred embodiments of the invention.

In general, the process of the present invention involves removing vanadium from the ore as a volatile chloride in a chlorination step; removing uranium from the tails of the chlorination step by means of an alkali metal carbonate leach; and extracting the radium from the resulting residue by means of a hydrochloric acid leach. By properly carrying on the chlorination steps, substantially all of the extractable vanadium is removed from the ore in the first step so that the extracts from subsequent leaching operations are not contaminated with vanadium. Volatile chlorides containing vanadium as the only metal therein are separated in the chlorination step so that substantially no chlorination agent is lost in chlorinating other metals. Similarly, the alkali metal carbonate leach extracts substantially all of the extractable uranium without extracting substantial amounts of other metals so that only enough alkali carbonate is required to convert the uranium to soluble form and extractable uranium is not present in the residue to interfere with radium separation. In the radium extraction step therefore only enough hydrochloric acid is required to extract the radium and the resulting solutions are substantially free from vanadium and uranium and need no further treatment for the recovery of these metals.

The preferred chlorination step is carried out in accordance with the process disclosed in my Patent No. 1,834,622 granted December 1, 1931. As disclosed in that patent, a mixture of chlorine and sulfur dichloride vapors are brought into contact with the ore at an elevated temperature. Volatile compounds of a desired metal are formed and separated from the ore in vapor form. The sulfur dichloride selectively reduces the various oxides of metals depending upon the temperature employed and the reduced metal combines with chlorine to form volatile compounds referred to. In the case of vanadium the temperature required is ordinarily between 300° and 450° C. and best results are usually obtained in the neighborhood of 350° C. In general, no metals are present in ores of the type contemplated by the present invention which reduce and form volatile compounds at or below these temperatures, but if an ore containing such metals is encountered, the metals can be selectively reduced and chlorinated so as to be separated from the ore at a lower temperature. By then raising the temperature substantially pure vanadium compounds can be recovered.

The chlorination can be carried on in nickel apparatus, which has been found to be extremely resistant to corrosion in the presence of the gaseous mixture of sulfur dichloride and chlorine even at temperatures much higher than those necessary for the chlorination of vanadium. The ore is preferably maintained at the required operating temperature and passed in countercurrent relation with the gas. A suitable apparatus is shown in my Patent No. 2,116,725, granted May 10, 1938. The volatile vanadium compounds separated from the ore, which compounds may be, for example, $VOCl_3$ or $VOCl_3 \cdot SCl_2$, may be condensed to liquid form and the vanadium separated therefrom in any desired manner. Neither radium nor uranium are removed from the ore by the chlorination process at the temperature mentioned.

The residue or tails from the chlorination step may then be treated with an alkaline metal carbonate solution such as a 3 to 15% solution of sodium carbonate. The required strength of solution will usually fall between 5 and 10% concentration. The temperature during leaching with the carbonate solution will ordinarily be between 80° and 100° C. and will usually be approximately 90° C. Under these conditions substantially all of the uranium capable of being extracted can be removed from the ore without removing any substantial amount of any other metal present. Merely agitating the ore with the carbonate solution at the required temperature and separating the extract from the ore by decantation, filtration, etc., will in most cases substantially completely extract the uranium. Under these conditions a substantial excess of carbonate will usually be required for substantially complete extraction of the uranium. In countercurrent operations in which the ore is extracted in two or more stages and fresh solutions are employed to treat ores from which a part of the uranium has been extracted, and partly spent solutions are employed to partially extract ore directly from the chlorination process, substantially equivalent amounts of carbonate solution can be employed so as to minimize loss of the reagent.

The resulting residue or tails from the uranium leaching step is then preferably washed to free the same of carbonate which washing solution can be employed to make up the sodium carbonate leaching solution in order to conserve uranium and sodium carbonate. The washed residue may then be leached with a hydrochloric acid solution to extract radium. The strength of the acid solution will also range between 3 and 15% and preferably between 5 and 10%. Leaching can be carried on from room temperature up to 100° C. and preferably about 90° C. By employing countercurrent leaching as described with respect to uranium leaching, substantially all of the radium can be leached from the ore with very little excess, if any, of hydrochloric acid. Extremely good recovery can be had, however, by a single leaching operation in which the ore is agitated with the acid solution in a single step, particularly if a substantial excess of acid is employed. The extract can be separated from the ore by decantation or filtration, preferably the latter. The radium can be precipitated from the extract in any desired manner known to the art. Solutions of other acids which form soluble salts of radium such as nitric acid may be substituted for hydrochloric acid in the leaching operation.

In carrying out the various extraction steps of the present invention, the lowest temperature which gives adequate extraction should ordinarily be employed. For example, increasing the temperature during chlorination above that at which chlorination goes forward rapidly merely causes loss of chlorine in the tails without appreciably increasing the amount of vanadium recovery. Substantially the same thing is true in the uranium and radium leaching operations. That is to say, increasing the temperature or strength of leaching solution above that which produces rapid extraction, in general, merely increases the loss of reagent by forming insoluble compounds in the tails or extracting unwanted materials.

Although ores, such as carnotite, as they naturally occur, may be subjected to the above described process, in general, increased recovery of the metals and better separation thereof will be produced if the ore is roasted prior to chlorination at a temperature between 1700° and 1900° F. and preferably at 1800° F. Also, greatly increased recovery and better separations of the metals will be obtained with most ores if modified in accordance with the process disclosed in my copending application, Serial No. 352,798, filed August 15, 1940. This process comprises adding alkaline earth metal compounds, such as halides, oxides, carbonates, etc. or silica or selected combinations of these materials to the ore prior to roasting in order to adjust the composition of the ore, such that at least a 1 to 1 molecular ratio of CaO to $R_2O_3$ is present and at least a 3 to 1 molecular ratio of $SiO_2$ to $$\left(R_2O_3 + \frac{CaO}{3}\right)$$

and preferably at least a 3 to 1 molecular ratio of $SiO_2$ to $R_2O_3 + CaO$ is present and also such that the incipient fusion point of the ore occurs at the temperature of roasting which should be approximately 1800° F. In the above ratios all of the materials present are calculated as oxides, R is used to represent metals such as aluminum, iron and manganese which form oxides of the form $R_2O_3$ and any other alkaline earth metals present are calculated as calcium. By adjusting the composition of the ore and roasting at approximately 1800° F. the vanadium recovery is increased as well as the recovery of uranium and radium and also there is a sharper separation of the metals by the extraction steps.

Thus, it may be seen that I have provided a process which recovers and separates vanadium and uranium with a minimum of reagents employed and that extensive purification of the extracted metals is avoided. Thus, the chlorination step removes substantially all of the extractable vanadium so that subsequent leaching operations do not produce extracts contaminated with vanadium. Leaching of the tails of the chlorination process with an alkali carbonate removes substantially all of the extractable uranium, none of the alkali carbonate is used up in extracting vanadium and the extract of a subsequent acid leaching operation for extracting radium is not contaminated with either vanadium or uranium. That is to say, extracting the tails from the uranium extraction step with hydrochloric acid extracts relatively pure radium chloride. This process is in marked contrast with a process in which an alkali metal carbonate is employed to leach the ore in the first instance. Such a leaching operation inevitably extracts part of the vanadium as well as uranium and difficulty is then encountered in separating this vanadium from the uranium. The process of the present invention is also in marked contrast with processes involving leaching the ore in the first instance with hydrochloric acid. The acid extracts vanadium, uranium and radium requiring difficult separation steps. The process of the present invention is in further contrast with processes in which the ore is, in the first instance, extracted with sulfuric acid. This acid extracts uranium and vanadium but renders the radium insoluble and difficult to extract even with hydrochloric or nitric acid. It will be appreciated that the process of the present invention results in substantially no loss of the various extraction agents due to extraction of unwanted metals. The vanadium is readily recovered from a vaporized product of the chlorination process in substantially any form desired as the vanadium compounds in the vaporized product are relatively easily decomposed or converted into other compounds. Because of the purity of the uranium extract the uranium may be easily precipitated therefrom or could even be recovered by evaporating the extract. The same is true of the radium extract. If it is not desired to recover radium, it will be apparent that the process of the present invention is applicable to the recovery of vanadium and uranium only.

While I have disclosed the preferred embodiments of my invention, it is understood that the details thereof may be varied within the scope of the following claims.

I claim:

1. The process of separately recovering vanadium, uranium, and radium values from an ore containing the same which also contains compounds of other metals which form oxides in which the metal is trivalent and which contains as a component a member from the group composed of silica and alkaline earth metal compounds, which comprises making suitable additions of a component to said ore to adjust the composition thereof to produce at least a 1:1 molecular ratio of CaO to $R_2O_3$ and a 3:1 molecular ratio of $SiO_2$ to $$\left(R_2O_3+\frac{CaO}{3}\right)$$

where all of the materials are calculated as oxides and R represents said metal which forms oxides in which the metal is trivalent, roasting the modified ore at a temperature of approximately 1800° F., separating a volatile chloride of vanadium from the roasted ore by treating the same at a temperature of approximately 350° C. with a mixture of gases containing chlorine and sulfur dichloride, then leaching uranium from said ore with a solution of an alkali metal carbonate, and then leaching radium from said ore with a solution of an acid which forms soluble radium salts.

2. The process of separately recovering vanadium and uranium from ores containing the same which also contain compounds of other metals which form oxides in which the metal is trivalent and which contain as a component a member from the group composed of silica and alkaline earth metal compounds, which comprises adding an amount of at least one of said components which will bring the temperature of incipient fusion of said ore between approximately 1700° to 1900° F., roasting the resulting ore at said temperature of incipient fusion so as to increase the content of vanadium which is extractable by weak acidic solutions or chlorination, extracting vanadium from the roasted ore by chlorination with chlorine and sulphur dichloride and then leaching uranium from the ore with a solution of an alkali metal carbonate.

3. The process of separately recovering vanadium and uranium from ores containing the same which also contain compounds of other metals which form oxides in which the metal is trivalent and which contain as a component a member from the group composed of silica and alkaline earth metal compounds, which comprises adding an amount of at least one of said components which will bring the temperature of incipient fusion of said ore between approximately 1700° to 1900° F., roasting the resulting ore at said temperature of incipient fusion so as to increase the content of vanadium which is extractable by weak acidic solutions or chlorination, separating a volatile compound of vanadium from the roasted ore by chlorination with chlorine and sulphur dichloride, then leaching uranium from the ore with a solution of an alkali metal carbonate, and then leaching radium from the ore with a solution of an acid which forms soluble radium salts.

4. The process of separately recovering vanadium, uranium, and radium values from an ore containing the same which also contains compounds of other metals which form oxides in which the metal is trivalent and which contain as a component a member from the group composed of silica and alkaline earth metal compounds, which comprises, adding an amount of at least one of said components which will bring the temperature of incipient fusion of said ore between approximately 1700° and 1900° F., selecting the added components so as to approach a one to one molecular ratio of CaO to $R_2O_3$ and a three to one molecular ratio of $SiO_2$ to $$\left(R_2O_3+\frac{CaO}{3}\right)$$

where all of the materials present are calculated as oxides and R represents said metals forming oxides in which the metal is trivalent, roasting the resulting ore at said temperature of incipient fusion so as to increase the content of vanadium which is extractable by weak acidic solutions or chlorination, separating a volatile compound of vanadium from the roasted ore by treating the ore at an elevated temperature with a mixture of gases containing chlorine and sulphur dichloride, then leaching uranium from the ore with a solution of an alkali metal carbonate, and then leaching radium from the ore with a solution of an acid which forms soluble radium salts.

5. The process of separately recovering vanadium and uranium values from an ore containing the same which also contains compounds of other metals which form oxides in which the metal is trivalent and which contains a relatively large amount of silica and also contains an alkaline earth metal compound, which comprises adding an amount of an alkaline earth metal compound which will bring the temperature of incipient fusion of said material between approximately 1700° to 1900° F., roasting the resulting ore at said temperature of incipient fusion so as to increase the content of vanadium which is extractable by weak acidic solutions or chlorination, then separating a volatile compound of vanadium from the roasted ore by treating the ore at an elevated temperature with a mixture of gases containing chlorine and sulphur dichloride, and then leaching uranium from said ore with a solution of an alkali metal carbonate.

6. The process of separately recovering vanadium and uranium from ores which contain vanadium, uranium, and silica and relatively large amounts of alkaline earth metal compounds, which comprises, adding an amount of silica which will bring the temperature of incipient fusion of said material between approximately 1700° to 1900° F., roasting the resulting ore at said temperature of incipient fusion so as to increase the content of vanadium which is extractable by weak acidic solutions or chlorination, then separating a volatile compound of vanadium from the roasted ore by treating the ore at an elevated temperature with a mixture of gases containing chlorine and sulphur dichloride, and then leaching uranium from said ore with a solution of an alkali metal carbonate.

7. The process of separately recovering vanadium and uranium from ore containing the same which also contains compounds of other metals which form oxides in which the metal is trivalent and which contains as a component a member of the group composed of silica and alkaline earth metal compounds, which comprises adding an amount of at least one of said components which will bring the temperature of incipient fusion of said ore between approximately 1700° to 1900° F., selecting the added components so as to approach a one to one molecular ratio of CaO to $R_2O_3$ and a three to one molecular ratio of $SiO_2$ to $$\left(R_2O_3 + \frac{CaO}{3}\right)$$

where all of the materials present are calculated as oxides and R represents said metals forming oxides in which the metal is trivalent, roasting the resulting ore at said temperature of incipient fusion so as to increase the content of vanadium which is extractable by weak acidic solutions or chlorination, extracting vanadium from the roasted ore by chlorination with a mixture of gases consisting essentially of sulphur dichloride and chlorine at a temperature of approximately 350° C., and then leaching uranium from the ore with a solution of sodium carbonate.

8. The process of separately recovering vanadium, uranium and radium from ores containing the same which also contain compounds of other metals which form oxides in which the metal is trivalent and which contain as a component a member of the group composed of silica and alkaline earth metal compounds, which comprises adding an amount of at least one of said components which will bring the temperature of incipient fusion of said ore to approximately 1800° F., roasting the resulting ore at said temperature of incipient fusion so as to increase the content of vanadium which is extractable by weak acidic solutions or chlorination, extracting vanadium from said material with a mixture of gases consisting essentially of sulphur dichloride and chlorine, then leaching uranium from the ore with a solution of an alkali metal carbonate, and then leaching radium from the ore with a solution of an acid which forms soluble radium salts.

9. The process of separately recovering vanadium and uranium from ores containing the same which also contain compounds of other metals which form oxides in which the metal is trivalent and which contain as a component a member from the group composed of silica and alkaline earth metal compounds, which comprises adding an amount of at least one of said components which will bring the temperature of incipient fusion of said ore to approximately 1800° F., roasting the resulting ore at said temperature of incipient fusion so as to increase the content of vanadium which is extractable by weak acidic solutions or chlorination, extracting vanadium from said material with a mixture of gases consisting essentially of sulphur dichloride and chlorine and then leaching uranium from said material with a solution of an alkali metal carbonate.

10. The process of separately recovering vanadium and uranium from ores containing the same which also contain compounds of other metals which form oxides in which the metal is trivalent and which contain as a component a member of the group composed of silica and alkaline earth metal compounds, which comprises adding an amount of at least one of said components which will bring the temperature of incipient fusion of said ore to approximately 1700° F.–1900° F., roasting the resulting ore at said temperature of incipient fusion so as to increase the content of vanadium which is extractable by weak acidic solutions or chlorination, extracting vanadium from the roasted ore by chlorination with chlorine and sulphur dichloride and then leaching uranium from the ore with a solution of alkali metal carbonate.

LESLIE G. JENNESS.